United States Patent

Froelich et al.

[11] Patent Number: 5,865,266
[45] Date of Patent: Feb. 2, 1999

[54] STEERING WHEEL LINKAGE FOR ROBOTIC SYSTEM FOR AUTOMATED DURABILITY ROAD (ADR) FACILITY

[75] Inventors: Mark A. Froelich, Onsted; Stephan A. Vitous, Howell, both of Mich.

[73] Assignee: Chrysler Corporation, Auburn Hills, Mich.

[21] Appl. No.: 641,715

[22] Filed: May 2, 1996

[51] Int. Cl.⁶ .............................. B62D 5/00; B25J 11/00
[52] U.S. Cl. .............................. 180/443; 74/494; 901/50
[58] Field of Search ...................... 180/443, 444, 180/79.1; 74/494; 73/118.1, 116, 117; 114/144 E, 144 A, 144 R; 901/50

[56] References Cited

U.S. PATENT DOCUMENTS

| | | | |
|---|---|---|---|
| 3,003,363 | 10/1961 | De Hart | 74/494 |
| 3,465,577 | 9/1969 | Donovan . | |
| 3,556,244 | 1/1971 | Gray . | |
| 3,713,332 | 1/1973 | Herrbrich . | |
| 3,774,568 | 11/1973 | Borst et al. | 114/144 R |
| 3,895,545 | 7/1975 | Hunter | 74/494 |
| 4,170,953 | 10/1979 | Pounder et al. | 114/144 E |
| 4,334,221 | 6/1982 | Rosenhagen et al. . | |
| 4,361,202 | 11/1982 | Minovitch . | |
| 4,379,497 | 4/1983 | Hainsworth et al. . | |
| 4,530,056 | 7/1985 | MacKinnon et al. . | |
| 4,554,824 | 11/1985 | King et al. . | |
| 4,556,940 | 12/1985 | Katoo et al. . | |
| 4,602,334 | 7/1986 | Salesky . | |
| 4,700,301 | 10/1987 | Dyke . | |
| 4,777,601 | 10/1988 | Boegli . | |
| 4,790,177 | 12/1988 | King et al. . | |
| 4,855,656 | 8/1989 | Saitoh et al. . | |
| 4,860,209 | 8/1989 | Sugimoto et al. . | |
| 4,939,651 | 7/1990 | Onishi . | |
| 5,036,935 | 8/1991 | Kohara . | |
| 5,172,589 | 12/1992 | Witt . | |
| 5,175,480 | 12/1992 | McKeefery et al. . | |
| 5,189,612 | 2/1993 | Lemercier et al. . | |
| 5,220,497 | 6/1993 | Trovato et al. . | |
| 5,270,628 | 12/1993 | Noguchi et al. . | |
| 5,295,551 | 3/1994 | Sukonick . | |
| 5,299,130 | 3/1994 | Ono . | |
| 5,318,143 | 6/1994 | Parker et al. . | |
| 5,363,027 | 11/1994 | Noguchi . | |
| 5,369,581 | 11/1994 | Ohsuga et al. . | |
| 5,369,591 | 11/1994 | Broxmeyer . | |
| 5,372,035 | 12/1994 | Ogawa et al. . | |
| 5,394,743 | 3/1995 | Noguchi et al. . | |
| 5,396,792 | 3/1995 | Kohsaka et al. . | |
| 5,415,034 | 5/1995 | Nishikawa et al. . | |
| 5,420,794 | 5/1995 | James . | |
| 5,448,479 | 9/1995 | Kemner et al. . | |
| 5,469,356 | 11/1995 | Hawkins et al. . | |
| 5,485,892 | 1/1996 | Fujita . | |
| 5,615,581 | 4/1997 | Cordioli | 74/494 |

FOREIGN PATENT DOCUMENTS

| | | |
|---|---|---|
| 0 236 518 A1 | 9/1987 | European Pat. Off. . |
| 0 235 333 B1 | 5/1989 | European Pat. Off. . |
| 20 04 979.0-52 | 4/1974 | Germany . |
| 37 44 631 A1 | 7/1989 | Germany . |
| 39 40 588 A1 | 6/1991 | Germany . |

OTHER PUBLICATIONS

Jurgen Raschke and Bodo Titze, "Automatic Driver for Exhaust Emission and Consumption Measurements", ATZ Automobomiltechnische Zeitschrift 88 (1986) 7/8, pp. 417–419.

*Primary Examiner*—Sherman Basinger

[57] ABSTRACT

A robotic device for turning a steering wheel of a vehicle includes an electric motor and a telescoping turning shaft connected to the motor. An adapter couples the steering wheel to the turning shaft.

16 Claims, 6 Drawing Sheets

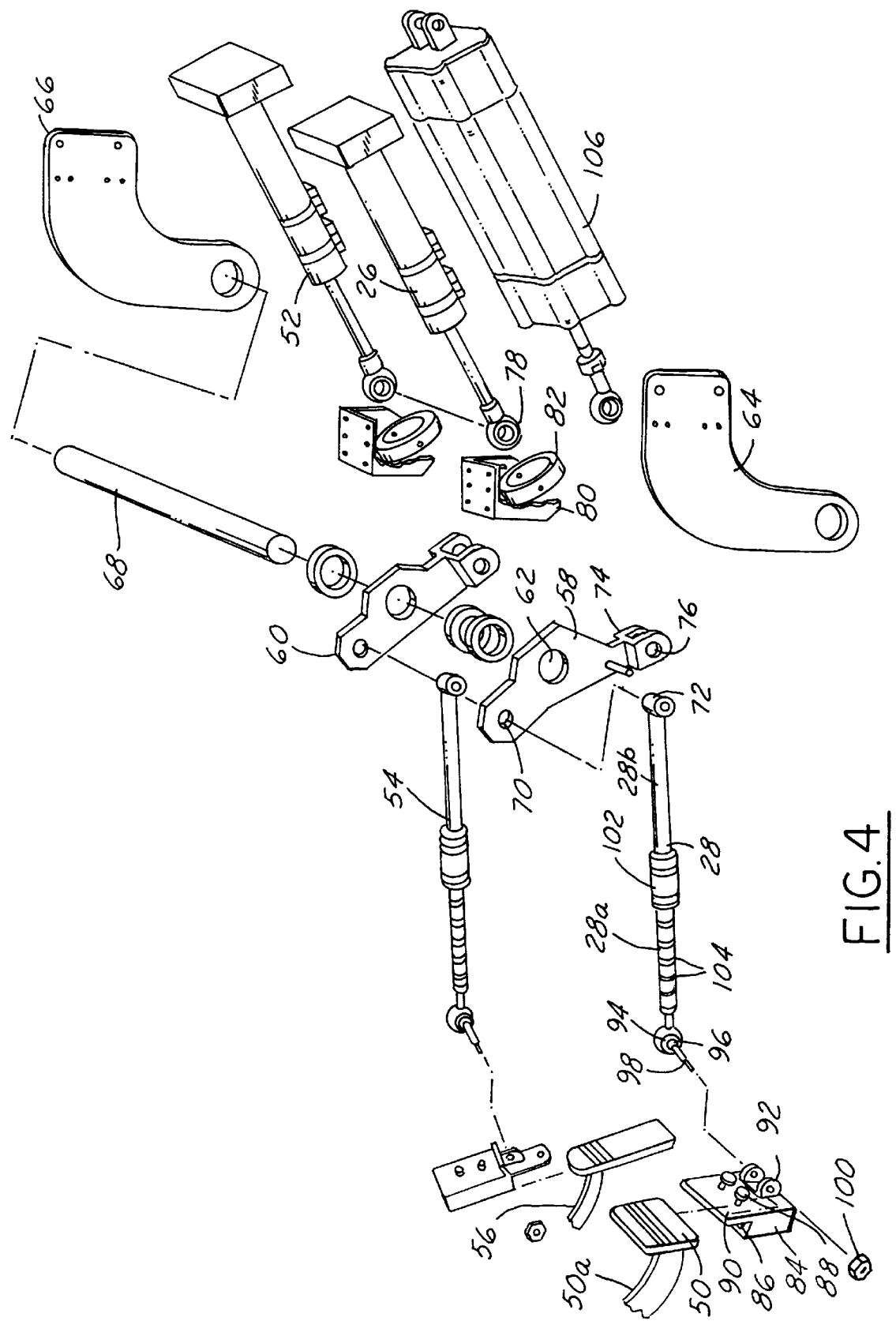

STEERING WHEEL LINKAGE FOR ROBOTIC SYSTEM FOR AUTOMATED DURABILITY ROAD (ADR) FACILITY

RELATED APPLICATIONS

This application is related to the following co-pending U.S. patent applications which are incorporated herein by reference:

Ser. No. 08/509,256, now U.S. Pat. No. 5,602,450, for an invention entitled "APPARATUS FOR REMOTELY OPERATING AN AUTOMOBILE IGNITION SYSTEM"; now U.S. Pat. No. 5,602,450

Ser. No. 08/706,883 for an invention entitled "VEHICLE CONTROL SYSTEM FOR AUTOMATED DURABILITY ROAD (ADR) FACILITY";

Ser. No. 08/642,234 for an invention entitled "PEDAL LINKAGE FOR ROBOTIC CONTROL OF VEHICLE";

Ser. No. 08/641,714 for an invention entitled "FLOOR SHIFTER LINKAGE FOR ROBOTIC CONTROL OF VEHICLE"; and Ser. No. 08/643,101 for an invention entitled "BASE PLATE FOR ROBOTIC SYSTEM FOR AUTOMATED DURABILITY ROAD (ADR) FACILITY".

FIELD OF THE INVENTION

The present invention relates generally to automobile testing, and more particularly to computer-controlled testing at automobile proving grounds.

BACKGROUND OF THE INVENTION

New models of vehicles are thoroughly tested by manufacturers at proving grounds prior to marketing the vehicles. Indeed, vehicle models that have been marketed for some time often undergo continued testing. Such testing includes prolonged operation of test vehicles around a test track, to determine the vehicles' operational fitness. The advantages of vehicle testing in ensuring safe, satisfactory vehicles having long been recognized, vehicle testing has become a necessary and ubiquitous part of vehicle development. It can be readily appreciated, however, that using human drivers to test drive vehicles hundreds of thousands of miles is economically costly for manufacturers and physically demanding on the drivers.

It happens that test time and mileage can be reduced, and test effectiveness enhanced, by driving test vehicles over rough test tracks, in addition to driving test vehicles over smoothly paved tracks. In other words, time can be saved, testing costs can be reduced, and test effectiveness can be improved by using rough tracks. Unfortunately, prolonged driving over rough tracks is extremely physically demanding on human test drivers. Indeed, a human driver's operating time over such tracks must be severely limited for the driver's protection.

As advantageously recognized by the present invention, the above-stated advantages of using vehicle testing can be realized without requiring human test drivers by providing a computer-controlled facility for testing vehicles. Thereby, test costs are significantly reduced and test driver fatigue and discomfort are eliminated.

The present invention further recognizes that an automated test facility should be capable of testing many types of stock vehicles. With this in mind, it is recognized herein that the automated test system be sufficiently robust to permit engagement with many types of vehicles. Otherwise, a plethora of test systems would have to be provided, thereby increasing cost and decreasing the efficacy of the automated test system. Stated differently, the present invention recognizes that an automated test system or subsystem should be compatible with a large number of vehicle models, to avoid the necessity of providing unique systems/subsystems for each model. To this end, the devices must be compact and preferably permit more than a single mounting configuration, so as not to interfere with other components.

Moreover, the present invention recognizes that many vehicles must be tested to assure statistically valid test results. To facilitate testing many vehicles, we recognize that the portion of the automated system which must be physically mounted on a test vehicle must be configured for rapid (preferably on the order of a few hours or less) engagement and disengagement with the test vehicle. Otherwise, the throughput of vehicles through the test facility would be reduced. This would be undesirable, because the advantages mentioned above that inhere to automated test track testing are magnified when large numbers of vehicles can be tested; a high vehicle throughput through the automated test procedures is therefore desirable.

Accordingly, it is an object of the present invention to provide, in an automated durability road facility, a robotic system for driving a vehicle along a predetermined track. Another object of the present invention is to provide a robotic system that is relatively compact and useful with a large number of vehicle models. Still another object of the present invention is to provide a robotic system that is robust, easy to install, and cost-effective.

SUMMARY OF THE INVENTION

A device for turning a steering wheel of a vehicle includes an electric motor and a preferably telescoping turning shaft connected to the motor. An adapter is connected to the steering wheel and turning shaft to couple the steering wheel with the turning shaft.

In accordance with the present invention, the vehicle defines a steering column axis and the turning shaft defines a turning shaft axis. Preferably, the device also includes a base which is positionable on a driver's seat of the vehicle. A bracket extends upwardly away from the base, and a motor mount holds the motor. In the preferred embodiment, the motor mount is pivotably engaged with the bracket for establishing the turning shaft axis to be substantially parallel to the steering column axis.

In a particularly preferred embodiment, the bracket is formed with a plurality of holes. The holes are formed in the bracket in a generally sequential pattern, and the motor mount is formed with at least one motor mount hole. A locking fastener is engageable with one of the holes in the bracket and with the motor mount hole to thereby hold the motor mount stationary with respect to the bracket.

The preferred adapter includes a ring-shaped wheel mount and at least one fastener for holding the wheel mount against the steering wheel. Moreover, the preferred adapter includes an adapter element which extends away from the wheel mount for engaging the turning shaft.

With particular respect to the preferred turning shaft, a distal universal joint includes a distal channel, and the adapter element is splined complementarily to the distal channel to prevent relative rotational motion between the turning shaft and adapter. On the other hand, the motor includes a rotor shaft that is keyed to the channel of a proximal universal joint.

In another aspect of the present invention, a vehicle includes a steering wheel, and an electric motor is coupled to the steering wheel by means of a turning shaft and a steering wheel adapter.

In still another aspect, a method for turning a steering wheel of a vehicle includes disposing an electric motor in the vehicle, and connecting a turning shaft to the motor. The method also includes connecting an adapter to the steering wheel and turning shaft. The motor can then be to turn the steering wheel.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is an exploded perspective view of the control pedal operators;

DETAILED DESCRIPTION OF THE PREFERRED EMBODIMENT

Figure 1:
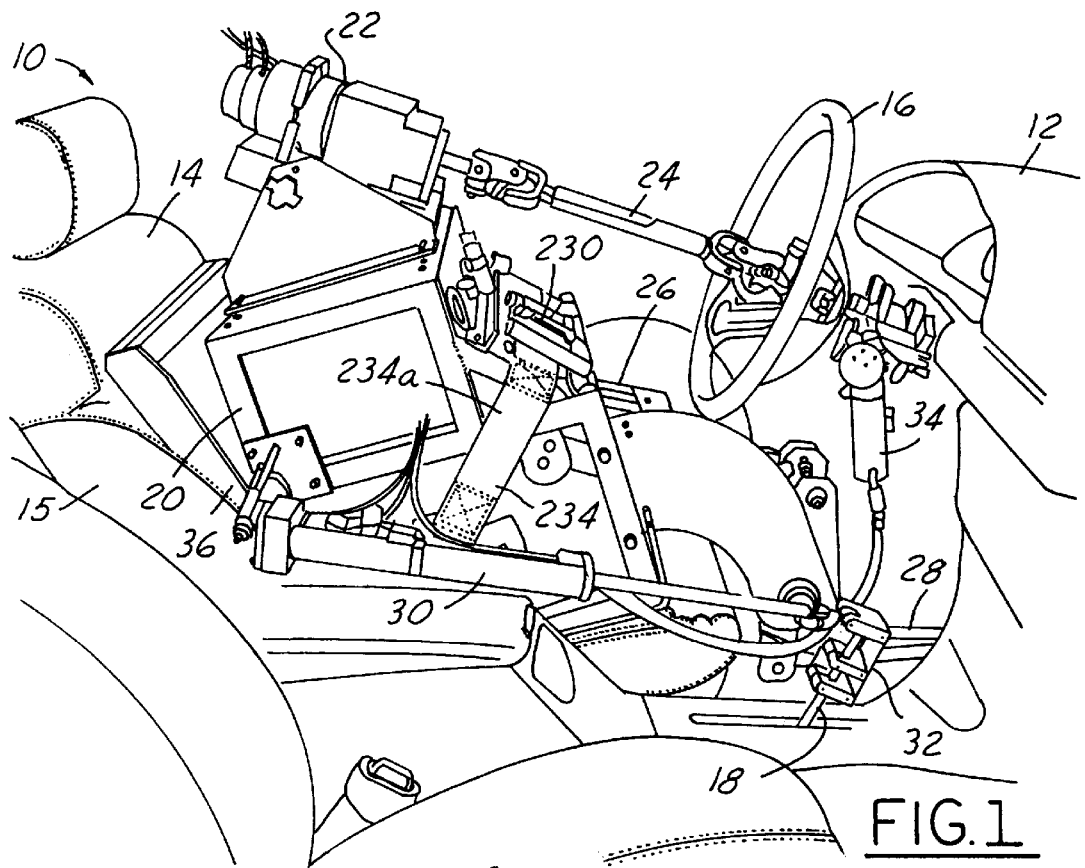
FIG. 1 is a perspective view of the passenger compartment of a vehicle with the robotic control system of the present invention installed.

Referring initially to FIG. 1, a robotic system is shown and generally designated 10 for guiding a vehicle 12 along a predetermined route by appropriately moving the interior controls of the vehicle 12. As discussed more fully below, the system 10 is robust, in that it can be installed in a wide variety of vehicle models without modification. Moreover, the system 10 can be relatively quickly installed in the vehicle 12, thereby economizing vehicle test costs.

As shown in FIG. 1, the vehicle 12 includes a driver's seat 14 having a back support 15 extending upwardly, a steering wheel 16, and a floor-mounted shift lever 18. As shown in subsequent Figures, the vehicle 12 also includes control pedals, i.e., a brake pedal and an accelerator pedal.

FIG. 1 is an overview of the novel robotic systems of the present invention that are discussed at greater length below. As shown in FIG. 1, a control unit, specifically a robotic body or base 20, is positionable on the driver's seat 14. A steering wheel motor 22 is mounted on the robotic body or base 20, and a telescoping turning shaft 24 is coupled to the steering wheel motor 22 and, via the steering wheel 16, the steering column of the vehicle 12 for turning the column when the steering wheel motor 22 turns the turning shaft 24.

Additionally, FIG. 1 shows a pedal actuator 26 which is mounted on the robotic body or base 20. A generally horizontally-disposed connecting rod 28 is coupled to the pedal actuator 26. As disclosed further below, the connecting rod 28 is engaged with a pedal 50, 56 of the vehicle 12 for reciprocating motion relative thereto for depressing and releasing the pedal when the connecting rod 28 is reciprocated by the pedal actuator 26.

In addition to the structure discussed above, a shifter actuator 30 is mounted on the robotic body or base 20. A shifter adapter 32 is coupled to the shifter actuator 30 and is engaged with the shift lever 18 for moving the shift lever 18 when the shifter adapter 32 is moved by the shifter actuator 30.

With the above disclosure in mind, it will be appreciated that the robotic system 10 operates all of the interior controls of the vehicle 12. In addition, a key actuator 34 operates the ignition switch of the vehicle 12. The details of the actuator 34 are disclosed in the first of the above-referenced related patent applications. It is to be understood that the robotic system 10 can operate in cooperation with the inventions disclosed in the second of the above-referenced related patent applications.

Figure 2:
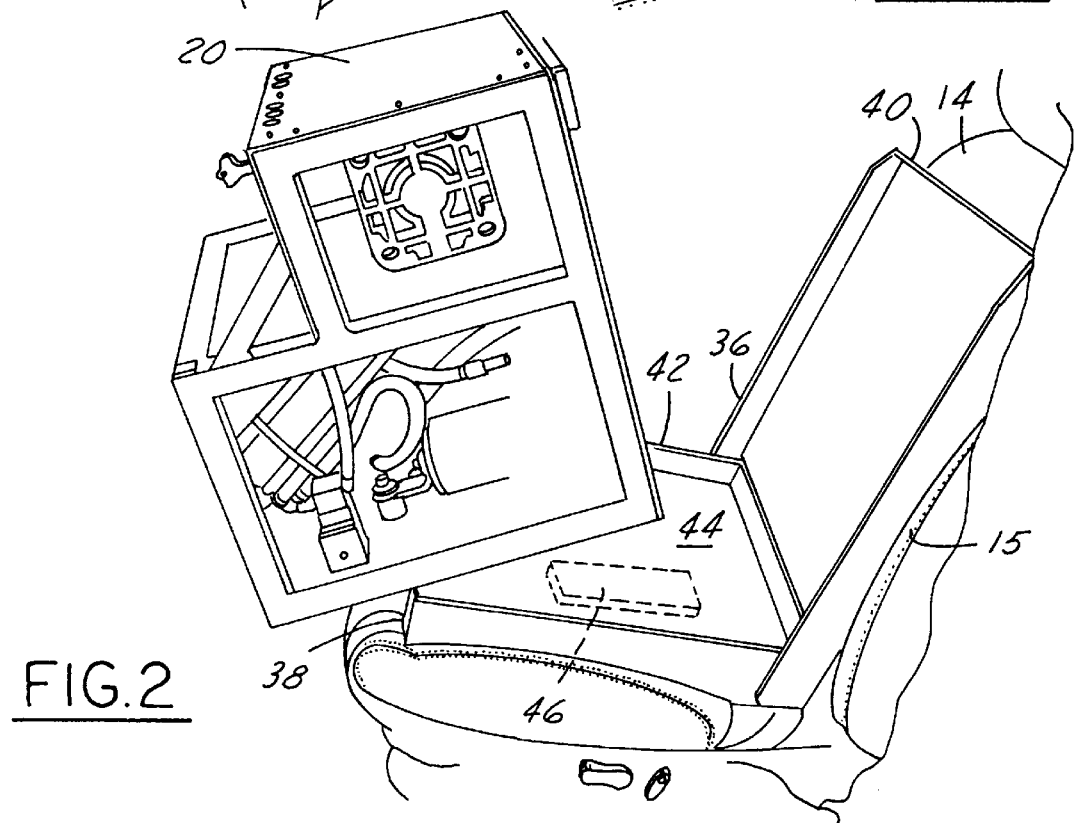
FIG. 2 is a perspective view of the robotic base in an exploded relationship with the base plate of the present invention, with portions of the control system omitted for clarity.

FIG. 2 shows the presently preferred method for mounting the robotic body or base 20 in the vehicle 12. As shown, a hollow metal, preferably aluminum or steel, base 36 is formed with a rectangular-shaped seat surface 38, and the seat surface 38 is positionable against the seat 14. The base 36 includes a parallelepiped-shaped back plate 40 which extends upwardly away from and perpendicularly to the seat surface 38. With this structure, the robotic body or base 20 can be positioned on the base 36.

In still greater detail of the base 36, a plurality of seat walls 42 extend upwardly from the surface 38 and the walls 42 bound the surface 38 when the surface 38 is positioned against the seat 14. A ballast space 44 is established between the seat walls 42, and a lead or steel weight 46, shown in phantom in FIG. 2, can be positioned in the ballast space 44. As the skilled artisan will appreciate, the function of the weight 46 is to add weight to the system 10 as appropriate to approximate the weight of a person who would otherwise occupy the seat 14. To support the upper part of the robotic body or base 20, a plurality of back walls 48 extend outwardly from the back plate 40.

Figure 3:
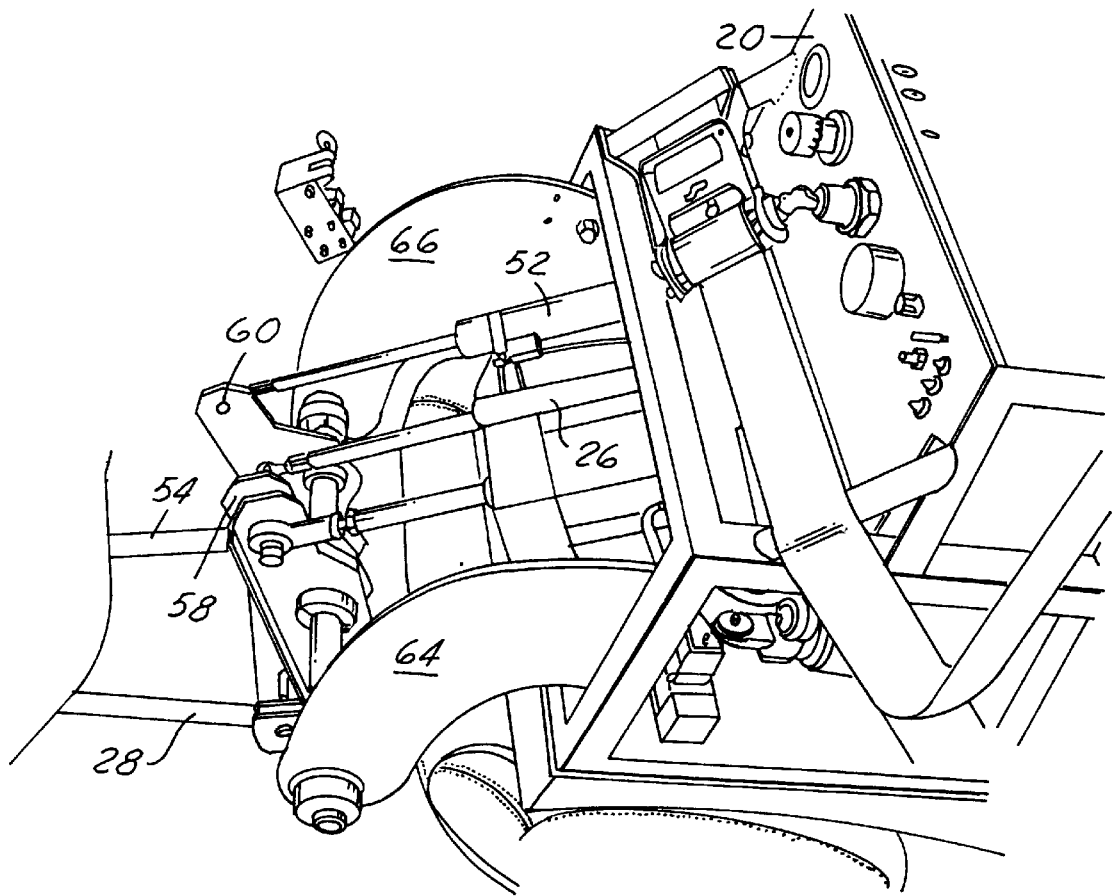
FIG. 3 is a perspective view of the control pedal operators.
Figure 5:
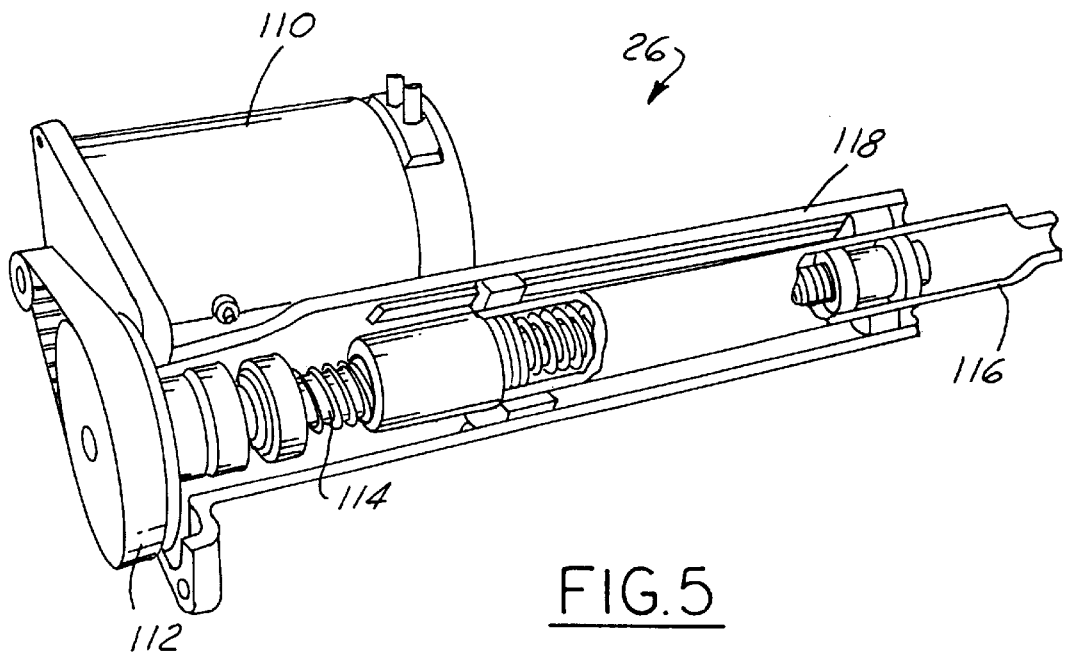
FIG. 5 is a cut-away view of an actuator of the present invention.

Referring now to FIGS. 3–5, the pedal actuators of the present invention can be seen. In the embodiment shown in FIGS. 3–5, the pedal actuator 26 with connecting rod 28 is mounted on the robotic body or base 20 and is connected to a brake pedal 50 of the vehicle 12. Accordingly, for purposes of disclosure the actuator 26 is a brake pedal actuator, and the connecting rod 28 is a brake connecting rod.

Additionally, an accelerator pedal actuator 52 is mounted on the base 20, and an accelerator connecting rod 54 is coupled to the accelerator pedal actuator 52 and to an accelerator pedal 56 of the vehicle 12. More particularly, the connecting rods 28, 54 are coupled to their respective connecting rods 26, 52 via respective pivot brackets 58, 60. In accordance with the present invention, each connecting rod 28, 54 with pivot bracket 58, 60 establishes a respective bell crank assembly for coupling the associated actuator 26, 52 with its respective pedal 50, 56.

Per the present invention, the actuators 26, 52 are identical to each other in construction and operation. Likewise, the bell crank assemblies are identical to each other in construction and operation. Accordingly, for clarity of disclosure only the brake pedal actuator 26 with bell crank assembly will be discussed.

FIG. 4 best shows that the brake pivot bracket 58 is formed with a central hole 62. The base 20 includes left and right knees 64, 66, and a cylindrical rod 68 is connected to the knees 64, 66 for engaging the central hole 62 of the brake pivot bracket 58. Accordingly, the brake pivot bracket 58 is rotatably engaged with the rod 68 for pivotable movement of the bracket 58 about the central hole 62.

In continued reference to FIG. 4, the brake pivot bracket 58 is formed with an upper hole 70. The brake connecting rod 28 is formed with a proximal hollow fitting 72, and a fastener (not shown) extends through the fitting 72 and is received in the upper 70 to thereby fasten the connecting rod 28 to the upper portion of the bracket 58.

FIG. 4 further shows that the brake pivot bracket 58 is formed with a lower "C"-shaped fitting 74 having a channel 76 formed therein. A hollow cylindrical actuator fitting 78 is formed on the brake pedal actuator 26, and the actuator fitting 78 is received in the "C"-shaped fitting 74 and held therein by a fastener (not shown) which extends through the channel 76 and actuator fitting 78.

To couple the brake pedal actuator 26 with the robotic body or base 20, a hollow parallelepiped-shaped trunnion housing 80 is attached to the robotic body or base 20 by means of, e.g., threaded fasteners (not shown). A trunnion 82 is pivotably disposed in the trunnion housing 80 for surroundingly supporting the actuator 26.

In contrast, to couple the brake connecting rod 28 to the brake pedal 50, a brake pedal sleeve 84 is provided. As can be appreciated in reference to FIG. 4, the brake pedal sleeve 84 defines a pocket 86 that is configured for closely receiving the brake pedal 50 therein. To hold the sleeve 84 onto the pedal 50, two threaded set screws 88 extend through the sleeve 84, and the screws 88 can be manipulated to abut the pedal 50. The sleeve 84 can also include a longitudinal slot 90 (shown in phantom) for receiving a shaft 50a of the pedal 50 therein.

A bracket 92 is formed on the sleeve 84. A ball coupling is engaged with the sleeve 84. More particularly, the ball coupling includes a socket 94 formed on the brake connecting rod 28, a ball 96 rotatably disposed in the socket 94, and an externally threaded joint axle 98 extending outwardly from the ball 96, with the joint axle 98 being received in the bracket 92. If desired, the axle 98 is held in engagement with the bracket 92 by an internally threaded nut 100.

With the above-disclosed combination of structure, the operation of the brake pedal 50 can be appreciated. The brake pedal actuator 26 can be activated to reciprocate relative to the robotic body or base 20. The direction of this reciprocal motion is changed to motion that is almost exclusively longitudinal (with respect to the vehicle 12) by the cooperation of the components of the present bell crank assembly, to depress and release the brake pedal 50. Thereby, precise control of the positions of the control pedals of the vehicle 12 is facilitated. Also, the control pedal operating systems of the present invention are advantageously oriented to avoid interference with other components.

In addition to the advantages noted above, in the presently preferred embodiment the brake connecting rod 28 telescopes, such that the length of the rod 28 can be selectively established. More specifically, the connecting rod 28 includes a first rod segment 28a, a second rod segment 28b, and a locking ring 102 having an inwardly oriented spring-loaded ball detent (not shown) which engages radial grooves 104 in the first rod segment 28a. In accordance with the present invention, the locking ring 102 is manipulable to a locked configuration, wherein the first rod segment 28a cannot be longitudinally moved relative to the second rod segment 28b. Moreover, the locking ring can be manipulated to an unlocked configuration, wherein the first rod segment 28a can be reciprocated relative to the second rod segment 28b to thereby establish the length of the rod 28.

Accordingly, it is to be understood that the present pedal operating system is robust, in that it can be used with a wide variety of vehicles, and that the present pedal operating system can be quickly and easily engaged with the vehicle 12. Specifically, the use of ball couplings results in a relatively large tolerance for the alignment between the components coupled by the ball couplings. Furthermore, the telescoping connecting rod 28 can be quickly and easily configured as appropriate for the particular model of the vehicle 12. Additionally, the pedal sleeve 84 can be quickly and easily engaged with the pedal 50. If desired, an emergency actuator 106 can be coupled to the brake pivot bracket 58 to depress the brake pedal 50 in the presence of an emergency stop signal.

FIG. 5 shows the details of the brake pedal actuator 26. In the presently preferred embodiment, the brake pedal actuator 26 is a screw-type actuator made by Ultra Motion of Mattituck, N.Y. Preferably, the actuator 26 is a 30 volt (DC) ball screw actuator with an eight inch (8") stroke, a five to one (5:1) belt drive ratio, a type B.125 screw ball, and a type E256 encoder, the neutral or "zero" position of which is calibrated during installation. Per the present invention, the actuator 26 is controlled by a type UM-1 tech-80 servo control board.

The above details may be seen in FIG. 5. The actuator 26 includes a DC motor 110 that drives a belt 112. In turn, the belt 112 is engaged with a screw drive 114. Rotational motion of the screw drive 114 is transformed into translational motion of an inner column 116 of the actuator 26 relative to an outer casing 118 of the actuator 26.

Figure 6:
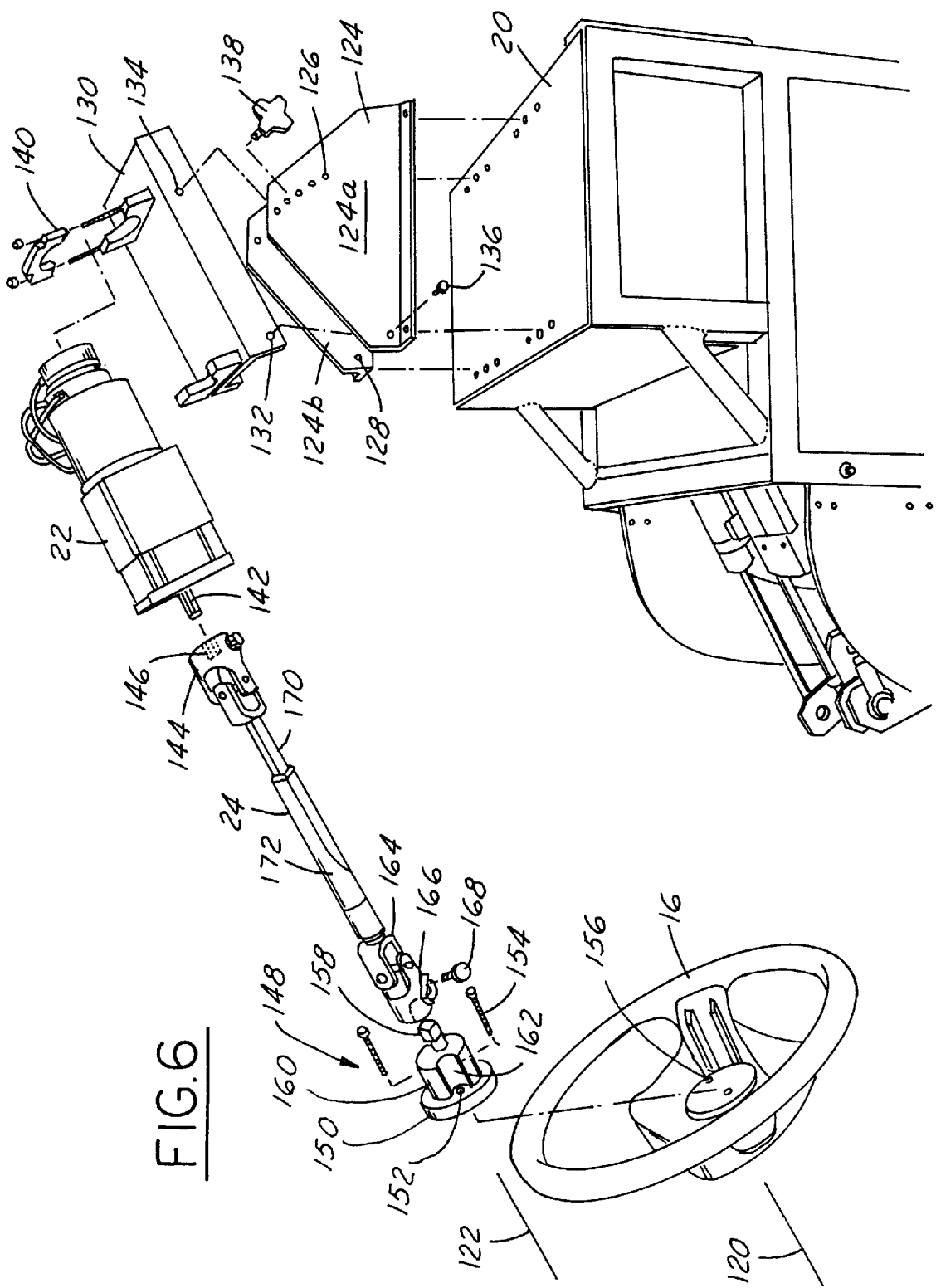
FIG. 6 is an exploded perspective view of the steering wheel operator.

Now referring to FIG. 6, the details of the steering wheel control system of the present invention may be seen. Recall that the steering wheel motor 22 is mounted on the robotic body or base 20 and is coupled to the steering wheel 16 via the turning shaft 24. In the preferred embodiment, the steering wheel motor 22 is a type IC-10260 DC motor made by Inductive Components of Salem, N.H.

As shown in FIG. 6, the vehicle 12 defines a steering column axis 120. Also, the turning shaft 24 defines a turning shaft axis 122. In accordance with the present invention, the steering wheel motor 22 is movably mounted on the body 20 for establishing the turning shaft axis to be substantially parallel to the steering column axis.

In a particularly preferred embodiment, a motor bracket 124 having two opposed bracket flanges 124a, 124b is affixed to the base 20 as by, e.g., threaded fasteners (not shown), and the motor bracket 124 extends upwardly away from the base 20. The motor bracket 124 is formed with a plurality of selection holes 126 therein. As shown, the selection holes 126 are formed in the motor bracket 124 in a generally sequential pattern. In the specific embodiment shown, the selection holes 126 are formed in a gentle arc that is oriented frontwardly and upwardly relative to the vehicle 12. Further, the bracket flanges 124a,b of the motor bracket 124 are each formed with a respective pivot hole 128 forward of the selection holes 126.

A generally parallelepiped-shaped motor mount 130 is formed with opposed pivot holes 132. Additionally, the motor mount 130 is formed with at least one motor mount hole 134. As can be appreciated in reference to FIG. 6, the motor mount 130 is positioned between the bracket flanges 124a, 124b with each pivot hole 132 of the motor mount 130 juxtaposed with a respective pivot hole 128 of the bracket 124, and with the motor mount hole 134 juxtaposed with a user-selected one of the selection holes 126.

A mount pivot shaft 136 extends through the pivot holes 128, 132 to pivotably engage the motor mount 130 with the bracket 124. Additionally, a locking fastener 138 is selectively engaged with one of the selection holes 126 in the bracket 124 and with the motor mount hole 134 to thereby selectively hold the motor mount 130 stationary with respect to the bracket 124.

The steering wheel motor 22 is held on the motor mount 130 by one or more motor brackets 140. With this structure, the motor mount 130 and, hence, steering wheel motor 22, can be pivoted on the bracket 124 to establish the turning shaft axis 122 as appropriate for the particular model of the vehicle 12.

Continuing with the description of FIG. 6, the steering wheel motor 22 includes a rotor shaft 142. Further, the turning shaft 24 includes a proximal universal joint 144 which is formed with a proximal channel 146. As contemplated by the present invention, the rotor shaft 142 is keyed complementarily to the proximal channel 146 to prevent relative rotational motion between the rotor shaft 142 and turning shaft 24.

FIG. 6 shows that an adapter 148 is engaged with the turning shaft 24. As shown, the adapter 148 is engaged with the steering column of the vehicle 12 via the steering wheel 16. More specifically, the adapter 148 includes a ring-shaped wheel mount 150 that is formed with a plurality of bolt holes 152, and a plurality of bolts 154 extend through the bolt holes 152 and are threadably engaged with receptacles 156 of the steering wheel 16 to hold the wheel mount 150 onto the steering wheel 16.

Also, the adapter 148 includes an adapter element 158 that is spaced from the wheel mount 150 and coupled to the wheel mount 150 by a block 160. The block 160 includes two bolt grooves 162 for receiving the bolts 154.

As shown in FIG. 6, the turning shaft 24 includes a distal universal joint 164, and the distal joint 164 is formed with a distal channel 166 (shown in phantom). As intended by the present invention, the adapter element 158 is splined complementarily to the distal channel 166 to prevent relative rotational motion between the turning shaft 24 and adapter 148. If desired, a set screw 168 can extend through the distal universal joint 164 and abut the adapter element 158, to hold the element 158 in the distal channel 166.

As disclosed above in reference to FIG. 1, and as can be appreciated in reference to FIG. 6, the turning shaft 24 longitudinally telescopes. More specifically, an inner shaft segment 170 is collinear with and is slidably engaged with an outer shaft segment 172. Accordingly, the length of the turning shaft 24 can be selectively established as appropriate for the particular model of the vehicle 12.

Figure 7:
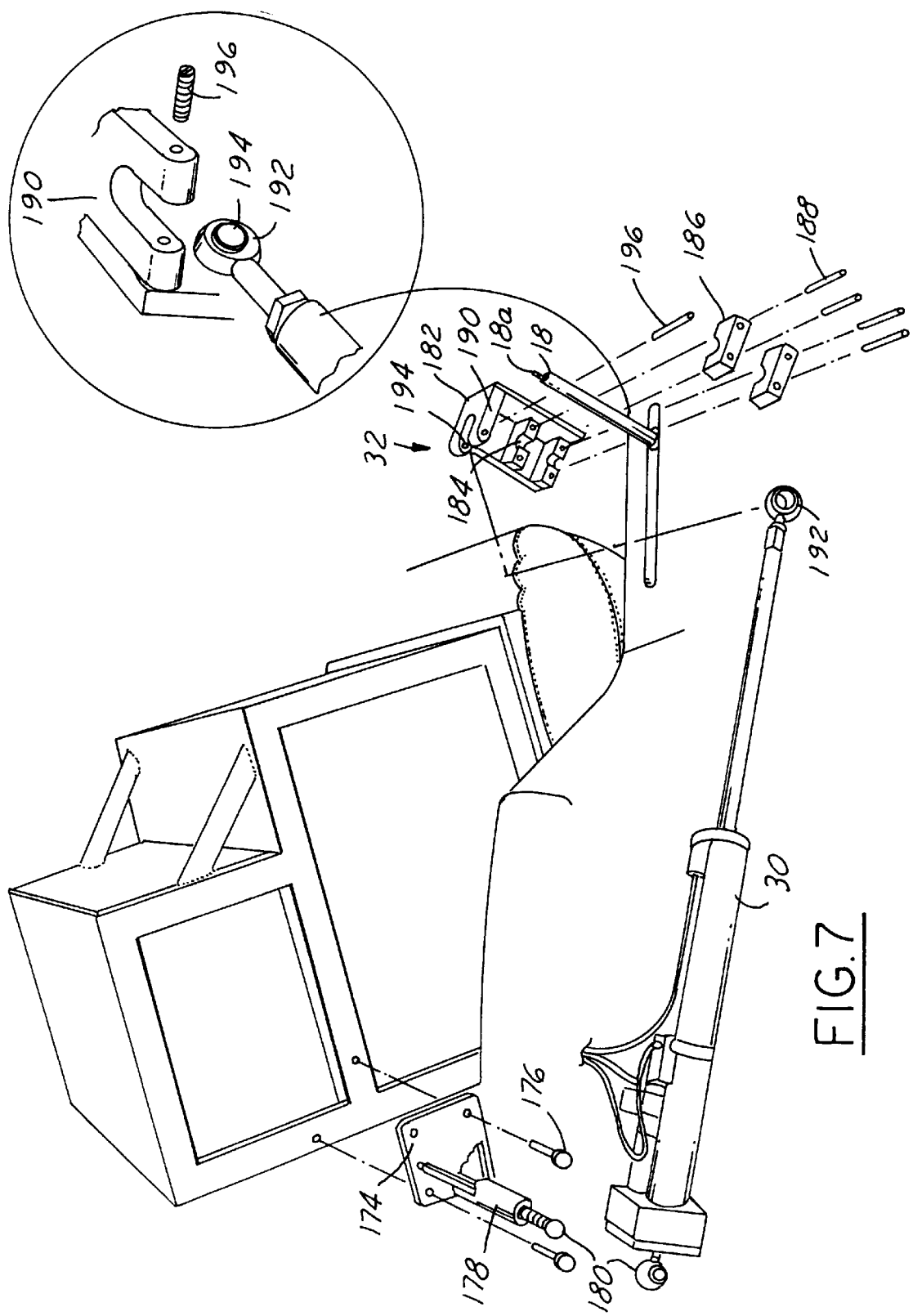
FIG. 7 is an exploded perspective view of the operator for floor-mounted shift levers.

Now referring to FIG. 7, the details of the shifter operating mechanism of the present invention for moving the floor-mounted shift lever 18 can be seen. It is to be understood that the shift lever 18 includes an operating detent 18a that is biased to a lock position, wherein the lever 18 cannot be moved. In accordance with principles well-known in the art, the operating detent 18a can be depressed to an unlock position, wherein the lever 18 can be moved. It is to be further understood that the shifter actuator 30 is in all essential respects identical in configuration and operation with the brake pedal actuator 26 shown in FIG. 5.

An actuator mount 174 is affixed to the base 20 by a plurality of bolts 176. The actuator mount 174 includes a cylindrical channel 178, and a proximal ball joint coupling 180 engages the shifter actuator 30 with the channel 178 as shown.

FIG. 7 also shows that the shifter adapter 32 includes a rigid housing 182 formed with a channel 184. It can be readily appreciated in reference to FIG. 7 that the channel 184 is configured for closely receiving the shift lever 18 therein. The shifter adapter 32 further includes a plurality of clamps 186 that are affixed to the housing 182 by a plurality of bolts 188, to thereby sandwich the lever 18 between the housing 182 and clamps 186, thereby holding the shift detent 18a in the unlocked position. Consequently, the shift actuator 30 can be reciprocated fore-and-aft with respect to the vehicle 12 to move the shift lever 18 into a particular gear position and hold it there, without requiring a separate operating mechanism to operate the detent 18a.

The housing 182 is formed with a top "U"-shaped surface 190 that urges the shift lever detent 18a to the unlock position. A socket 192 of a distal ball and socket coupling is positioned on the shift actuator 30, with a ball 194 of the distal ball and socket coupling positioned between the arms of the "U"-shaped surface 190. A set screw 196 extends through one of the arms of the top "U"-shaped surface to urge against the ball 194. We have found that the use of proximal and distal ball and socket couplings in the shift control mechanism just described enhances the robustness of the system 10.

Figure 8:
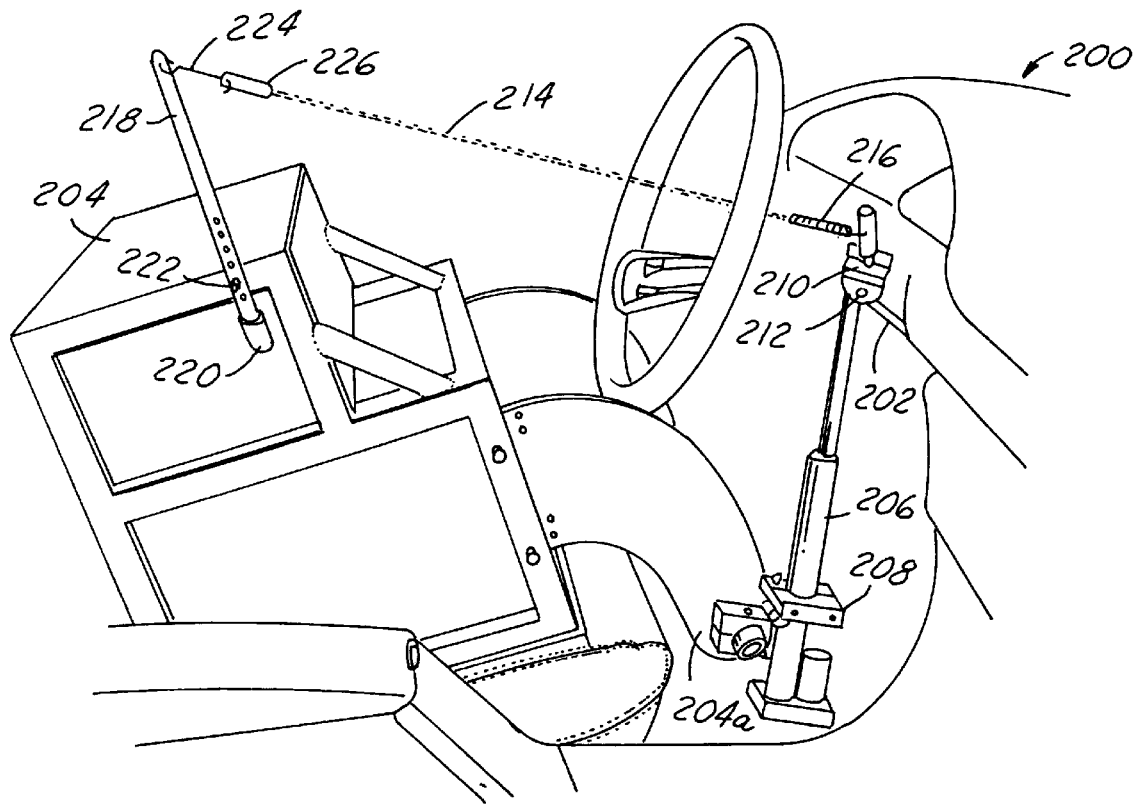
FIG. 8 is an exploded perspective view of the operator for column-mounted shift levers.

FIG. 8 shows that in an alternate embodiment, a vehicle, generally designated 200, can have a column-mounted shift lever 202 and a robotic base 204 that is substantially identical in configuration and operation with the base 20 described above, with the exceptions noted below. It is to be understood that the shift lever 202 is biased to a lock position, wherein the lever 202 cannot be moved. In accordance with principles well-known in the art, the lever 202 can be pulled rearwardly to an unlock position, wherein the lever 202 can be moved. It is to be further understood that a shifter actuator 206 which is in all essential respects identical in configuration and operation with the brake pedal actuator 26 shown in FIG. 5 interconnects a lower foot portion 204a of the base 204 with the lever 202.

More particularly, lower mounting brackets 208 affix the shifter actuator 206 to the base 202. The shift lever 202 is sandwiched between two halves of an upper mounting bracket 210. The shift actuator 206 is coupled to the upper mounting bracket 210 by a ball and socket coupling 212.

In accordance with the present invention, a holder 214 is attached in tension to the base 204 and shift lever 202 to hold the shift lever 202 in the unlocked position. In the presently preferred embodiment, the holder 214 is a wire line with a distal spring 216 attached to the shift lever 202 by, e.g., embedding or otherwise affixing the end of the distal spring 216 in the shift lever 202.

A holder rod 218 is received in a rod receptacle 220 of the base 204, and can be further engaged with the base 204 by means of a bolt 222. The holder rod 218 is oriented vertically, with a wire connector 224 extending through its upper end. The wire connector 224 in turn is attached to a proximal fitting 226, and the proximal fitting 226 attached to the holder wire 214. Consequently, the shift lever 202 is held in the unlocked position by the holder 214.

Figure 9:
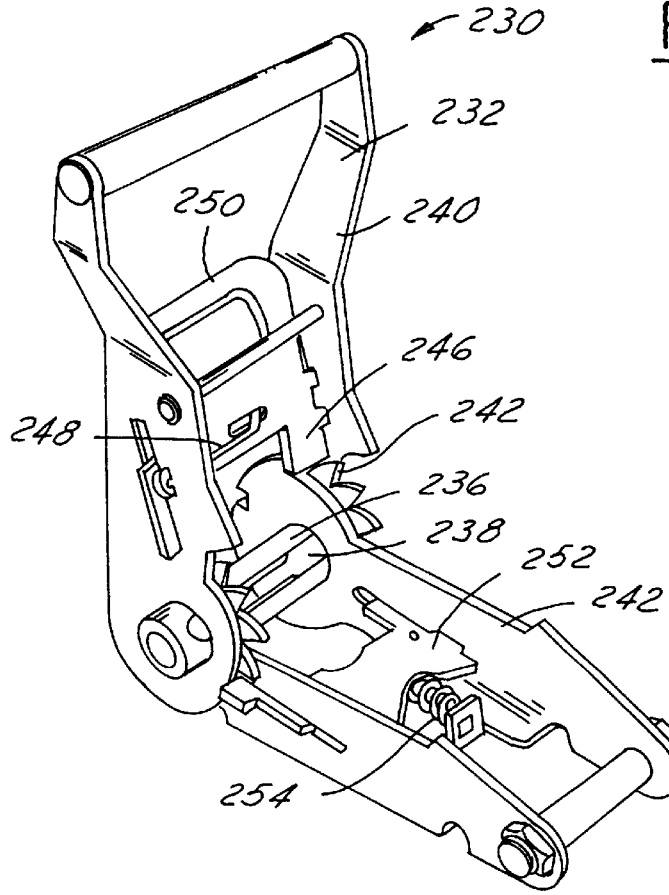
FIG. 9 is a perspective view of the ratchet buckle of the present invention, with portions of the seat belt broken away for clarity.

Now cross-referencing FIGS. 1 and 9, a ratchet buckle 230 having a hollow lever arm 232 is ratchetably engaged with a seat belt 234 of the vehicle 12. As shown best in FIG. 1, the belt is positioned across the base plate 36 and robotic body or base 20 for holding the robotic body or base 20 stationary relative to the seat 14. It is to be understood that in accordance with principles well-known in the art, the seat belt 234 includes a first belt segment 234a that is affixed to the vehicle 12 and a second belt segment (not shown in FIG. 1) that is also affixed to the vehicle 12.

The ratchet buckle 230 is ratchetably attached to the seat belt. Consequently, the base 20 can be positioned on the base plate 36 and the ratchet buckle 230 manipulated to ratchetably tighten the seat belt 234.

In a particularly preferred embodiment, the ratchet buckle 230 is a cargo-type ratchet buckle made by M&R Products of Vineland, N.J. As best shown in FIG. 9, it includes a pivot shaft 236 that is formed with a slot 238, and the seat belt is inserted through the slot 238. First and second arms 240, 242 of the handle 232 are ratchetably engaged with the pivot shaft 236.

With even greater specificity, a dual element ratchet gear 244 is attached to the pivot shaft 236. Moreover, a first pawl 246 is reciprocatingly engaged with the first arm 240 and is spring-biased toward the gear 244 by means of a wire spring 248 for ratchetable engagement with the ratchet gear 244. A pawl handle 250 is connected to the first pawl 246, e.g., by forming the handle 250 on the pawl 246, for manipulation thereof.

Stated differently, the first pawl 246 is biased toward an engaged position, wherein the first pawl 246 is ratchetably engaged with the ratchet gear 244. And, the pawl handle 250 can be manipulated to move the first pawl 246 toward a disengaged position, wherein the first pawl 246 is distanced from the ratchet gear 244 to thereby disengage the ratchet handle 230.

Additionally, a second pawl 252 is biased by means of a coil spring 254 into ratchetable engagement with the ratchet gear 244. With the above-stated combination of structure, the seat belt 234 shown in FIG. 1 can be positioned through the slot 238 and the ratchet handle 232 manipulated to ratchetably tighten the seat belt 234 around the robotic body or base 20. To loosen the seat belt 234, the pawl handle 250 is pulled to disengage the first pawl 246.

While the particular STEERING WHEEL LINKAGE FOR ROBOTIC SYSTEM FOR AUTOMATED DURABILITY ROAD (ADR) FACILITY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A device for turning a steering wheel of a vehicle comprising:
   an electric motor;
   an adapter having means for connecting to a steering wheel; and
   a telescoping turning shaft having a first section connected to said electric motor and a second section connected to said adapter, wherein said first section is movable relative to said second section such that said telescoping turning shaft can be lengthened and shortened so as to allow for variations in distance between said electric motor and said adapter.

2. A device for turning a steering wheel of a vehicle, device comprising:
   an electric motor;
   a turning shaft connected to said electric motor, said turning shaft defining a turning shaft axis;
   an adapter connected to said turning shaft and having means for connecting to a steering wheel;
   a base positionable on a driver's seat of the vehicle;
   a bracket extending upwardly away from said base; and
   a motor mount for holding said electric motor thereon, said motor mount being pivotably engaged with said bracket for establishing the turning shaft axis to be substantially parallel to a steering column axis of a vehicle.

3. The device of claim 2, wherein the bracket is formed with a plurality of holes therein, the holes being formed in the bracket in a generally sequential pattern, and wherein the motor mount is formed with at least one motor mount hole, and the device further includes a locking fastener engageable with one of the holes in the bracket and the motor mount hole to thereby hold the motor mount stationary with respect to the bracket.

4. The device of claim 2, wherein the adapter includes:
   a ring-shaped wheel mount;
   at least one fastener adapted for holding the wheel mount against a steering wheel; and
   an adapter element extending away from the wheel mount for engaging the turning shaft.

5. The device of claim 4, wherein the turning shaft includes a distal universal joint including a distal channel formed therein, and wherein the adapter element is splined complementarily to the distal channel to prevent relative rotational motion between the turning shaft and adapter.

6. The device of claim 5, wherein the motor includes a rotor shaft and the turning shaft includes a proximal universal joint including a proximal channel formed therein, and wherein the rotor shaft is keyed complementarily to the proximal channel to prevent relative rotational motion between the rotor shaft and turning shaft.

7. The device of claim 2, wherein said turning shaft telescopes to allow for variations in distance between said electric motor and said adapter.

8. A vehicle comprising:
   a steering wheel;
   an electric motor;
   an adapter connected to said steering wheel; and
   a telescoping turning shaft having a first section connected to said electric motor and a second section connected to said adapter, wherein said first section is movable relative to said second section such that said telescoping turning shaft can be lengthened and shortened so as to allow for variations in distance between said electric motor and said adapter.

9. The vehicle of claim 8, wherein the vehicle defines a steering column axis and the turning shaft defines a turning shaft axis, and the vehicle further comprises:
   a base positionable on a driver's seat of the vehicle;
   a bracket extending upwardly away from the base; and
   a motor mount for holding the motor thereon, the motor mount being pivotably engaged with the bracket for establishing the turning shaft axis to be substantially parallel to the steering column axis.

10. The vehicle of claim 9, wherein the bracket is formed with a plurality of holes therein, the holes being formed in the bracket in a generally sequential pattern, and wherein the motor mount is formed with at least one motor mount hole, and the vehicle further includes a locking fastener engageable with one of the holes in the bracket and the motor mount hole to thereby hold the motor mount stationary with respect to the bracket.

11. The vehicle of claim 9, wherein the adapter includes:

a ring-shaped wheel mount;

at least one fastener for holding the wheel mount against the steering wheel;

an adapter element extending away from the wheel mount for engaging the turning shaft.

12. The vehicle of claim 11, wherein the turning shaft includes a distal universal joint including a distal channel formed therein, and wherein the adapter element is splined complementarily to the distal channel to prevent relative rotational motion between the turning shaft and adapter.

13. The vehicle of claim 12, wherein the motor includes a rotor shaft and the turning shaft includes a proximal universal joint including a proximal channel formed therein, and wherein the rotor shaft is keyed complementarily to the proximal channel to prevent relative rotational motion between the rotor shaft and turning shaft.

14. A method for turning a steering wheel of a vehicle, comprising the steps of:

disposing an electric motor in the vehicle;

connecting a first section of a telescoping turning shaft to said electric motor;

connecting a second section of said telescoping turning shaft to an adapter;

whereby said first section is moved relative to said second section such that said telescoping turning shaft can be lengthened and shortened to allow for variations in distance between said electric motor and said adapter;

connecting said adapter to the steering wheel; and activating said electric motor to turn the steering wheel.

15. The method of claim 14, further comprising the step of selectively establishing a turning shaft axis to be substantially parallel to a steering column axis of the vehicle.

16. The method of claim 15, further comprising the steps of:

splining said adapter to said second section of said telescoping turning shaft; and keying said first section of said telescoping turning shaft to said electric motor.

* * * * *